United States Patent
Francis

(10) Patent No.: US 10,508,467 B2
(45) Date of Patent: Dec. 17, 2019

(54) ENGINEERED FLOOR AND SCAFFOLD SYSTEMS

(71) Applicant: biljax inc., Archbold, OH (US)

(72) Inventor: Einstein B. Francis, Archbold, OH (US)

(73) Assignee: biljax, inc., Archbold, OH (US)

( * ) Notice: Subject to any disclaimer, the term of this patent is extended or adjusted under 35 U.S.C. 154(b) by 133 days.

(21) Appl. No.: 15/237,730

(22) Filed: Aug. 16, 2016

(65) Prior Publication Data

US 2017/0051526 A1    Feb. 23, 2017

Related U.S. Application Data

(60) Provisional application No. 62/207,121, filed on Aug. 19, 2015.

(51) Int. Cl.
| | | |
|---|---|---|
| *E04H 15/56* | (2006.01) | |
| *E04H 3/28* | (2006.01) | |
| *E04G 1/15* | (2006.01) | |
| *F16B 9/02* | (2006.01) | |

(52) U.S. Cl.
CPC .............. *E04H 15/56* (2013.01); *E04G 1/15* (2013.01); *E04H 3/28* (2013.01); *F16B 9/026* (2013.01)

(58) Field of Classification Search
CPC .. E04H 15/56; E04H 3/28; E04H 3/24; E04C 2003/0404; E04C 2003/0408; E04F 15/0247; E04F 15/02458; E04F 15/02464; E04F 15/02447; E04F 15/02452; E04G 1/15; E04G 1/152; E04G 7/301; E04G 5/12; E04G 5/14; E04G 2005/125; E04G 7/02; E04G 7/34; F16B 9/026

USPC ....... 52/125.5, 125.6, 7, 263, 843, 846, 848, 52/264; 135/116, 120.3, 909, 908
See application file for complete search history.

(56) References Cited

U.S. PATENT DOCUMENTS

| | | | | |
|---|---|---|---|---|
| 1,586,053 A | * | 5/1926 | Snyder | E04C 3/06 52/846 |
| 3,130,470 A | * | 4/1964 | Bowden | E04G 11/48 211/186 |
| 3,221,466 A | * | 12/1965 | Downing, Jr. | E04B 9/10 403/219 |

(Continued)

FOREIGN PATENT DOCUMENTS

| | | | | |
|---|---|---|---|---|
| CA | 2705360 A1 | * | 5/2009 | ........ E04F 15/02458 |
| CA | 2758997 A1 | * | 10/2010 | ........ E04F 15/02452 |

(Continued)

OTHER PUBLICATIONS

Derwent 2017-6460W, clipped image and Abstract of KR 2017130739A to KIM which published May 19, 2016. (Year: 2016).*

(Continued)

*Primary Examiner* — Robert Canfield
(74) *Attorney, Agent, or Firm* — Schaffer, Schaub & Marriott LTD

(57) ABSTRACT

This unique modular flooring system with system scaffold understructure is an engineered system capable of use with most tent manufacturer's options. The engineered floor is for engineered clear span tents. This unique system transfers the load of the tent, tent frame, scaffold system and floor understructure to the ground through the tent leg. The system is configured so that the stage flooring section does not support the tent, tent frame, tent poles and scaffold system.

7 Claims, 14 Drawing Sheets

(56) References Cited

U.S. PATENT DOCUMENTS

| | | | | |
|---|---|---|---|---|
| 3,316,680 | A * | 5/1967 | Chrastek | E04F 15/02458 52/126.6 |
| 3,628,628 | A * | 12/1971 | Gilbreath | E04G 1/152 182/222 |
| 3,722,167 | A * | 3/1973 | Rousey | E04B 9/10 52/506.07 |
| 3,752,262 | A * | 8/1973 | Helms | E04G 5/14 182/113 |
| 3,811,237 | A * | 5/1974 | Bettinger | E04F 15/02447 52/126.6 |
| 3,924,370 | A * | 12/1975 | Cauceglia | E04F 15/0247 52/126.6 |
| 3,927,498 | A * | 12/1975 | Benedetti | E04B 1/24 52/79.1 |
| 4,630,417 | A * | 12/1986 | Collier | F24F 7/10 174/487 |
| 4,633,626 | A | 1/1987 | Freeman et al. | |
| 4,730,428 | A * | 3/1988 | Head | E04B 5/026 52/309.11 |
| 4,850,162 | A * | 7/1989 | Albrecht | E04F 15/02458 52/126.6 |
| 5,048,242 | A * | 9/1991 | Cline | E04F 15/02441 52/126.6 |
| 5,058,352 | A * | 10/1991 | Loiselle | E04B 1/7654 52/404.2 |
| 5,060,426 | A | 10/1991 | Jantzen | |
| 5,226,440 | A | 7/1993 | Fuhrman | |
| 5,778,999 | A | 7/1998 | Nealeigh | |
| 5,791,096 | A * | 8/1998 | Chen | E04F 15/02458 52/126.6 |
| 6,276,111 | B1 * | 8/2001 | Pittman, Sr. | B21D 39/04 403/205 |
| 7,389,614 | B2 * | 6/2008 | Sullivan | E04G 23/027 52/202 |
| 7,707,780 | B2 * | 5/2010 | Ouellet | E04B 5/10 52/126.5 |
| 7,874,115 | B2 | 1/2011 | Thiede | |
| 8,479,459 | B2 * | 7/2013 | Tucker | H01L 31/045 126/623 |
| 8,584,404 | B2 * | 11/2013 | Heidenreich | E04B 1/24 52/79.5 |
| 9,506,248 | B1 * | 11/2016 | Fields | E04H 15/56 |
| 2003/0167701 | A1 * | 9/2003 | Rich | E04B 1/003 52/79.6 |
| 2004/0211137 | A1 * | 10/2004 | Thiede | E04B 5/02 52/272 |
| 2007/0094962 | A1 * | 5/2007 | Schwoerer | B66C 1/105 52/263 |
| 2008/0053003 | A1 * | 3/2008 | Hockemeyer | E04B 1/34315 52/22 |
| 2008/0053017 | A1 * | 3/2008 | Hockemeyer | E04B 7/022 52/263 |
| 2008/0053018 | A1 * | 3/2008 | Hockemeyer | E04H 1/1205 52/263 |
| 2008/0053032 | A1 * | 3/2008 | Hockemeyer | E04B 7/024 52/651.07 |
| 2008/0263968 | A1 * | 10/2008 | Day | E04B 1/34321 52/79.1 |
| 2012/0005969 | A1 * | 1/2012 | Broden | E04B 1/34321 52/79.9 |
| 2012/0233961 | A1 * | 9/2012 | Matos | E04C 3/07 52/846 |
| 2013/0014466 | A1 * | 1/2013 | Eggers | E04B 1/24 52/653.2 |
| 2014/0123576 | A1 * | 5/2014 | Meyer | E04F 15/02452 52/126.6 |
| 2014/0262619 | A1 * | 9/2014 | Bains | E04G 1/06 182/113 |
| 2015/0121800 | A1 * | 5/2015 | Cipriani | E04B 9/10 52/848 |
| 2015/0337532 | A1 * | 11/2015 | Cipriani | E04B 9/10 52/848 |
| 2016/0208507 | A1 * | 7/2016 | Davis | E04G 1/15 |

FOREIGN PATENT DOCUMENTS

| | | | | |
|---|---|---|---|---|
| DE | 9101717 | U1 * | 12/1991 | E04F 15/02458 |
| DE | 9101717 | U1 * | 12/1991 | E04F 15/02458 |
| DE | 29520623 | U1 * | 2/1996 | E04H 15/56 |
| DE | 10209976 | A1 * | 10/2003 | E04F 15/02458 |
| EP | 0167509 | A2 * | 1/1986 | B66F 3/08 |
| EP | 393317 | A * | 2/1990 | |
| EP | 2304134 | B1 * | 3/2017 | E04B 1/003 |
| FR | 2585752 | A1 * | 2/1987 | E04F 15/02452 |
| GB | 1489411 | A * | 10/1977 | E04G 1/152 |
| JP | 2004270432 | A * | 9/2004 | E04H 15/44 |
| WO | 9117330 | A1 * | 11/1991 | E04F 15/02458 |
| WO | WO-2016080618 | A1 * | 5/2016 | E04H 15/00 |

OTHER PUBLICATIONS

Rental Network LTD., 40×60 Frame Tent Victoria BC by Rental Network, online video; Jan. 2, 2015, <URL: https://www.youtube.com/watch?v=C0YqEGnCn5c>.

Biljax Scaffold and Event Solutions, TF2100 BilJax Video HD 1080p, online video, Oct. 2, 2015, <URL: https://www.youtube.com/watch?v=K1eFW5DhKLY>.

Biljax Scaffold and Event Solutions, TF-2100 Tent Flooring Systems Assembly Instructions, online Instruction manual, Dec. 18, 2015. <URL: https://www.biljax.com/clientuploads/Catalogs/Event/TF2100%20Assembly%20Instructions.pdf>.

Notification of Transmittal of the International Search Report and the Written Opinion of the International Searching Authority, or the Declaration PCT/US16/47116 dated Dec. 28, 2016.

* cited by examiner

ENGINEERED FLOOR AND SCAFFOLD SYSTEMS

CROSS REFERENCE TO RELATED APPLICATION

This application claims the benefit of U.S. provisional patent application Ser. No. 62/207,121 filed on Aug. 19, 2015.

Ser. No. 62/207,121 herein is incorporated by reference. Ser. No. 62/207,121 especially shows the following:

TECHNICAL FIELD

Figure 1:
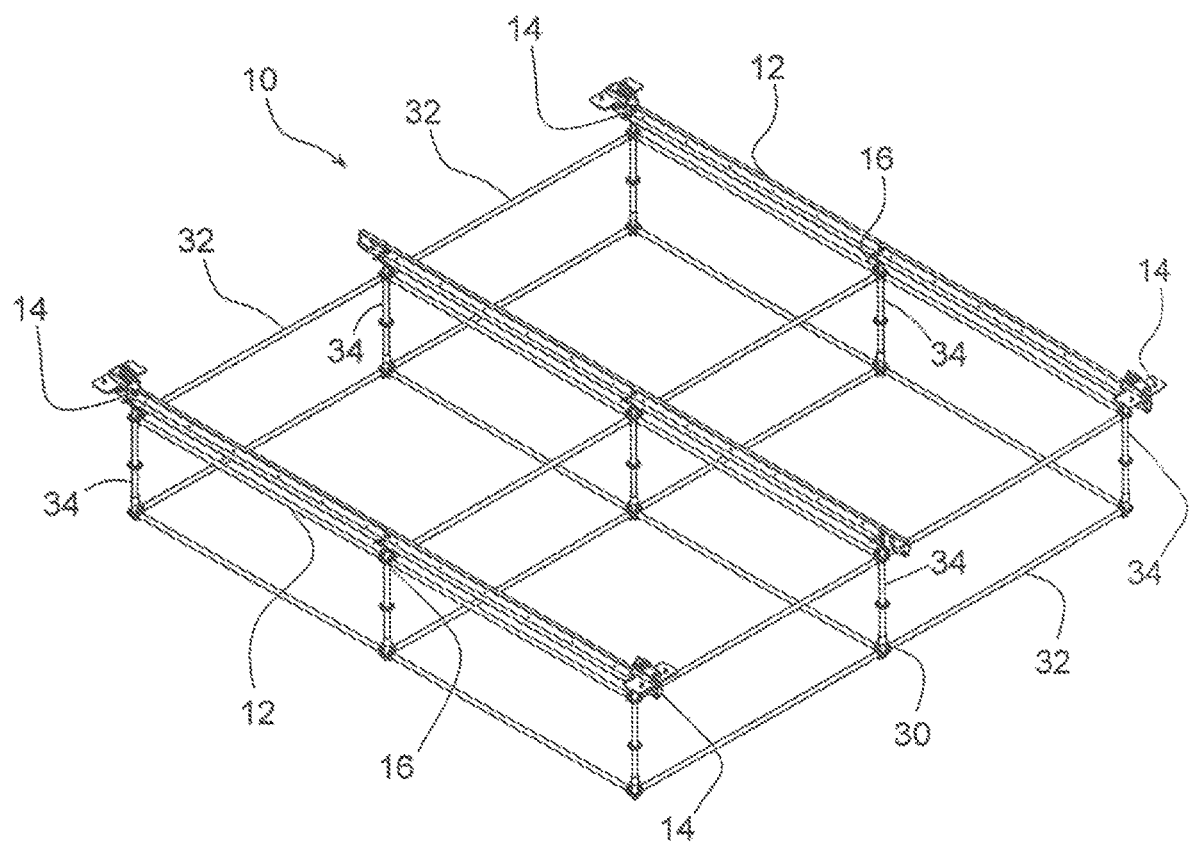

This invention relates to a unique modular flooring system for clear span tents and the understructures can be system scaffolding.

BACKGROUND OF THE INVENTION

Conventional tent, awning and canopy frame structures of readily assemblable and disassemblable nature are known. They are commonly made up of cylindrical tubing and various types of junction elements or connectors, or so-called slip fit or slip-on fittings, commonly termed corner, ridge intermediate, intermediate, three-way crown, four-way crown, six-way crown and eight-way crown fitting.

Often, the prior art systems do not include means for sealing against the weather and other environmental conditions at the joints where the various panels are joined. Another disadvantage is that the prior art shelters have to be built on unlevel ground, which is the normal situation. Unlevel ground poses a number of problems when a number of units have to be added to each other to produce a relatively large shelter.

Another shortcoming is that the prior art systems are not strong enough to support the tent and tent frame structure.

SUMMARY OF THE INVENTION

The unique modular flooring system with scaffold understructure of this invention provides a solution to the problems of the prior art systems. The engineered system of this invention is capable of use with most clear span tent manufacturer's structures.

Clear span tents and frame structures are designed and manufactured in such a way that, it can be assembled and disassembled in the site. The clear span tent and structures are temporary structures and they are used in the event rental industries most of the time. The clear span tent and the structures are designed to setup in a leveled surface. Most of the clear span tent legs (uprights) are pinned to a base plate and the base plates are secured to a leveled surface. The entire base plates in a particular tent setup have to be in same level. These base plates transfer entire load from the tent to the ground or to a floor where the base plants are secured.

Majority of the time the clear span tents and structures are not used in a leveled surface, instead it is used in an unleveled ground like golf courts. One or few of the base plates may sit on the ground level but the rest of them are in a different elevation from the ground. In order to get a leveled surface for base plates the customer has to create a platform. In the rental industry there is no engineered platforms designed to accommodate clear span tents and structures. So the customers use different staging products or they create a platform with scaffolding, wood and plywood.

The above mentioned poses the following challenges.
1. Safety of the tent platform.
2. These platforms are custom platforms and the load capacities of the platforms are questionable.
3. Transferring the tent base plate reactions and the platform load to the ground is questionable.
4. Most of the time there is no proper way securing the platform from uplift loads.
5. No proper guide line to assemble a clear span tent on top of a platform.

The TF-2100 Flooring system provides solution for all the above challenges because it is designed, engineered and manufactured to take different clear span tents and structures.

The engineered system of this invention solves many of the problems of prior art systems. First, the sides of the tent extend outside and below beam connectors. The enclosure system is economical and light weight in construction and provides for depositing rain water and snow on the ground outboard of the scaffold assembly.

Secondly, the tent and tent frame are supported by scaffold legs which support the engineered system of this invention. The unique platform and the beam invention don't support the tent and tent frame. But the platform and the beam transfer all the live load to the system scaffold legs. The upright connecters transfer entire tent leg (Upright) load to the system scaffold leg. The beam of this invention and the upright connecter of this invention together transfer entire loads platform live load, load from the tent and weight of the tent) to the system scaffold leg.

The tent floor can be 8" from the ground to 15 feet or even more from the ground. As a result, this system may support a tent on very unlevel ground. The load is transferred to the ground through the legs.

The components of this system's are universal beam, upright connector, beam connector, platforms, platform filler, universal saddle, and system scaffolding under structure.

Other objects and advantages of the present invention will become apparent to those skilled in the art upon a review of the following detailed description of the preferred embodiments and the accompanying drawings.

IN THE DRAWINGS

FIG. 1 shows the scaffold system of this invention without a platform.

Figure 2:
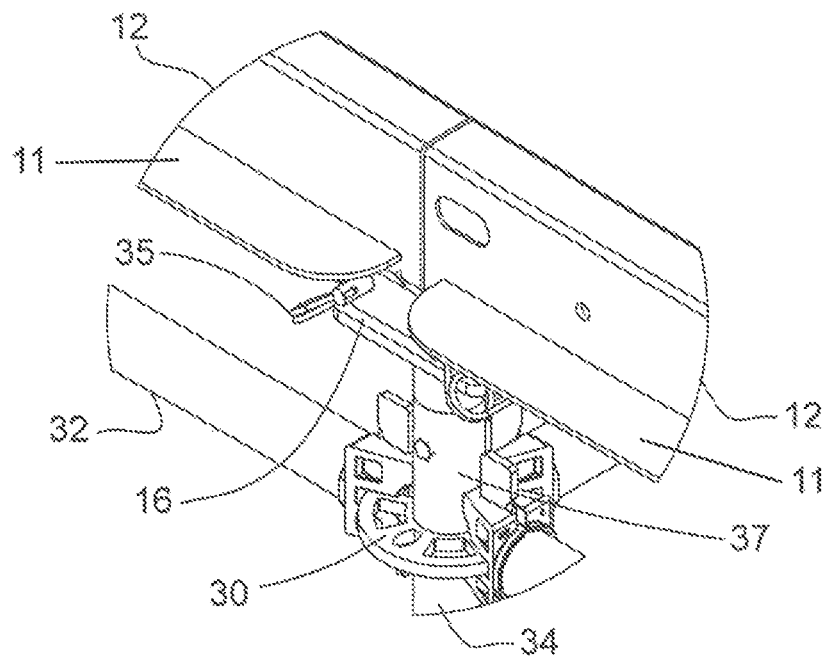

FIG. 2 shows the universal beam in place on a saddle according to this invention.

Figure 3:
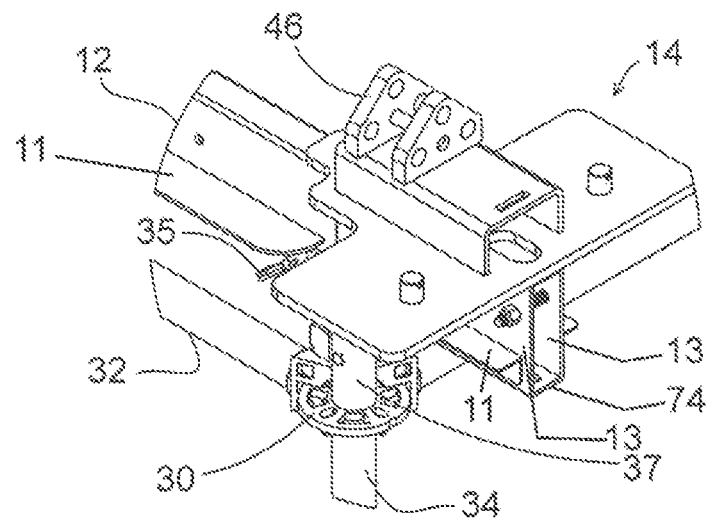

FIG. 3 shows the upright connector of this invention.

Figure 4:
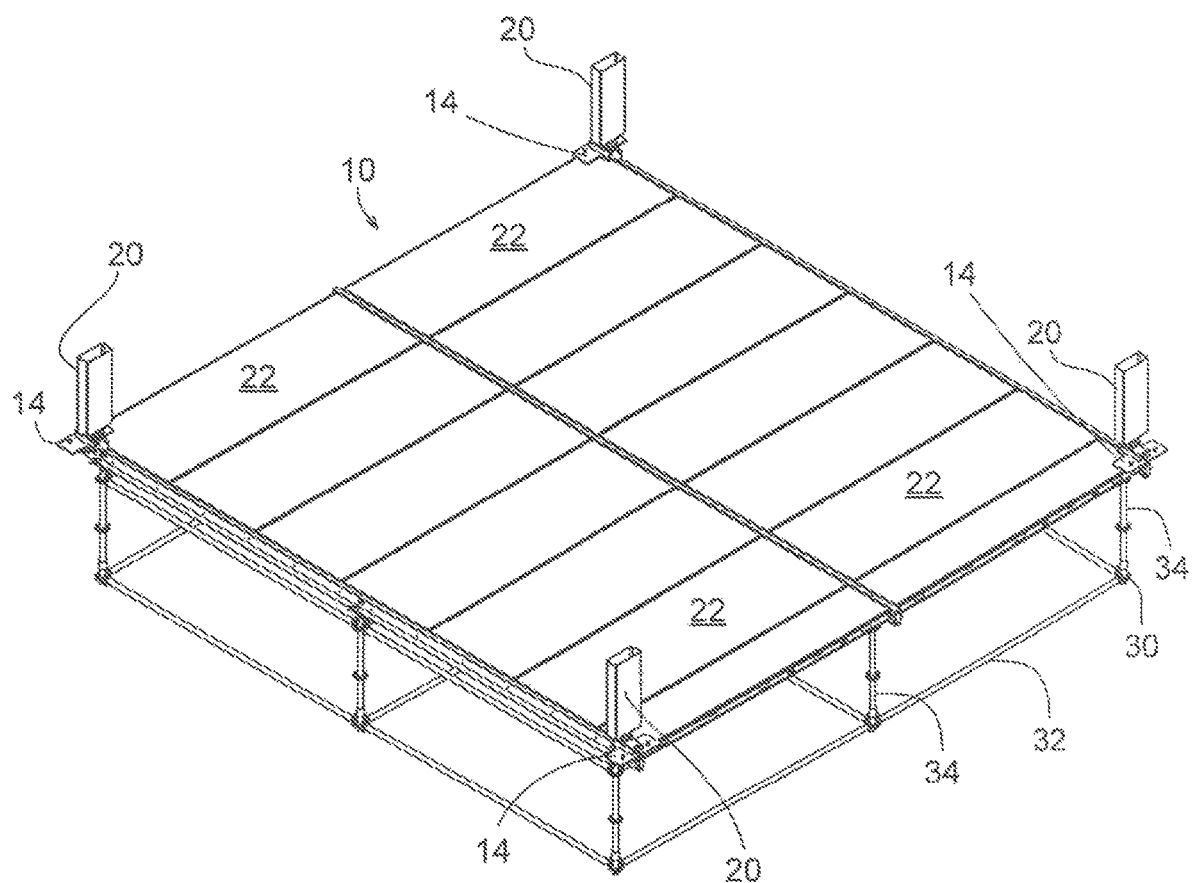

FIG. 4 shows clear span tent legs and platforms (flooring) in place on the scaffold system of FIG. 1.

Figure 5:
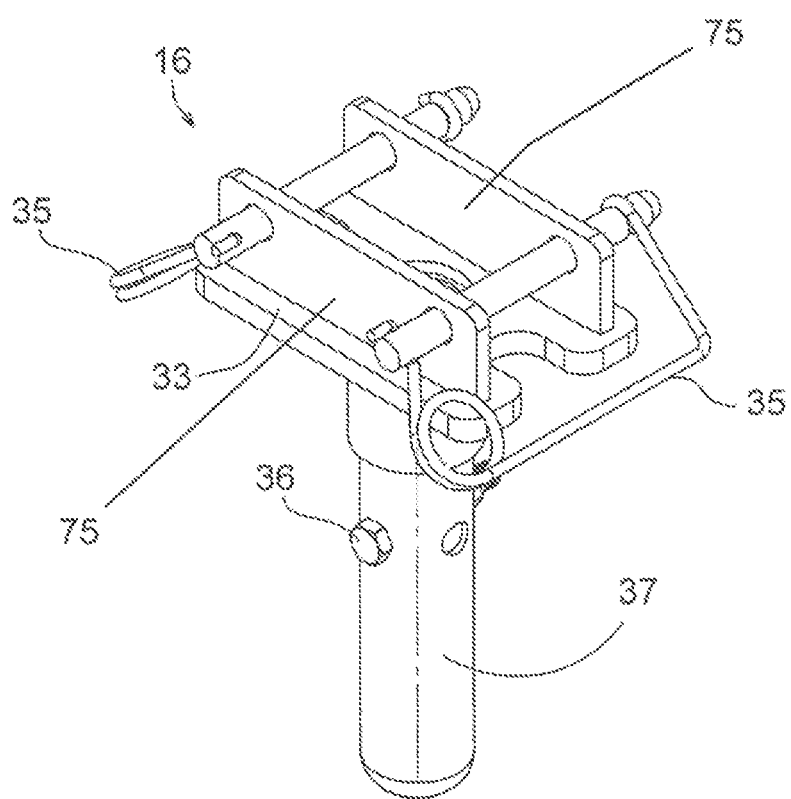

FIG. 5 shows the saddle of this invention.

Figure 6:
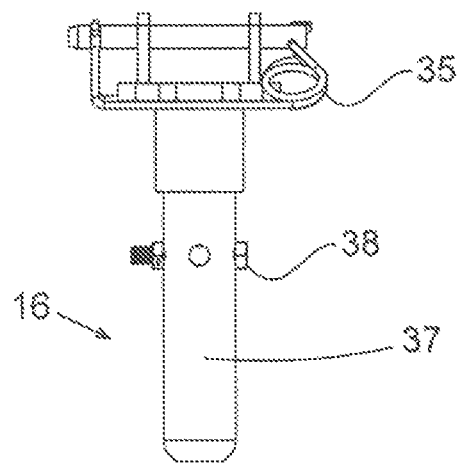

FIG. 6 shows a side view of the saddle of FIG. 5.

Figure 7:
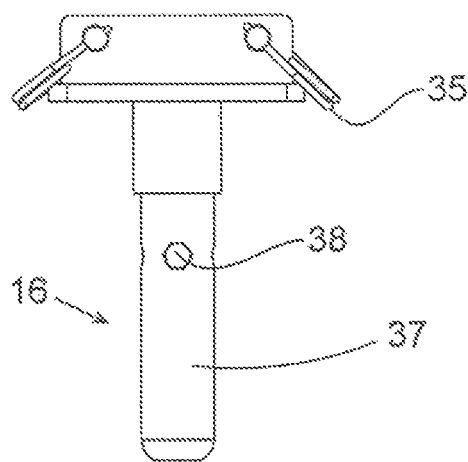
FIG. 7 shows an assembled corner joint showing the details of this invention.

FIG. 7 shows an end view of the saddle of FIG. 5.

Figure 8:
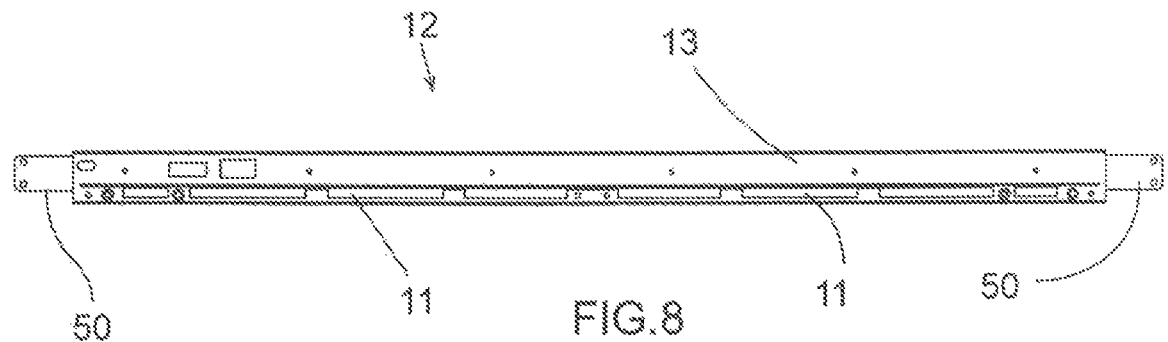
FIG. 8 shows the unique scaffold system and floor understructure of this invention.

FIG. 8 shows a side view of the universal beam of this invention.

Figure 9:
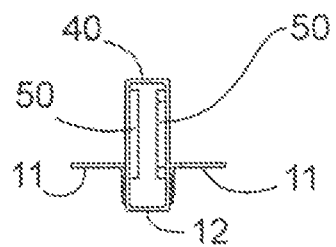
FIG. 9 shows a tent frame supported by the system of this invention.

FIG. 9 shows an end view of the universal beam of this invention.

Figure 10:
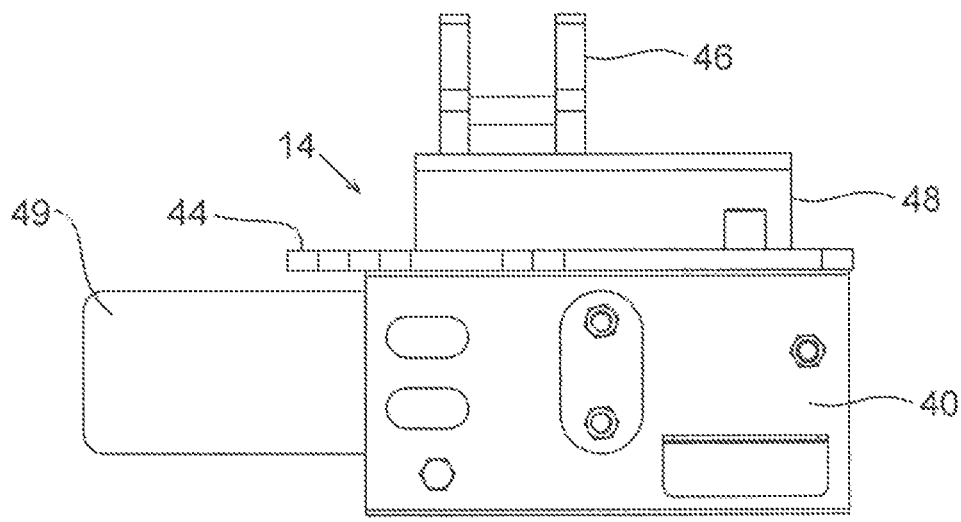
FIG. 10 shows a tent and tent frame supported by the system of this invention.

FIG. 10 shows a side view of the upright connector of FIG. 3.

Figure 11:
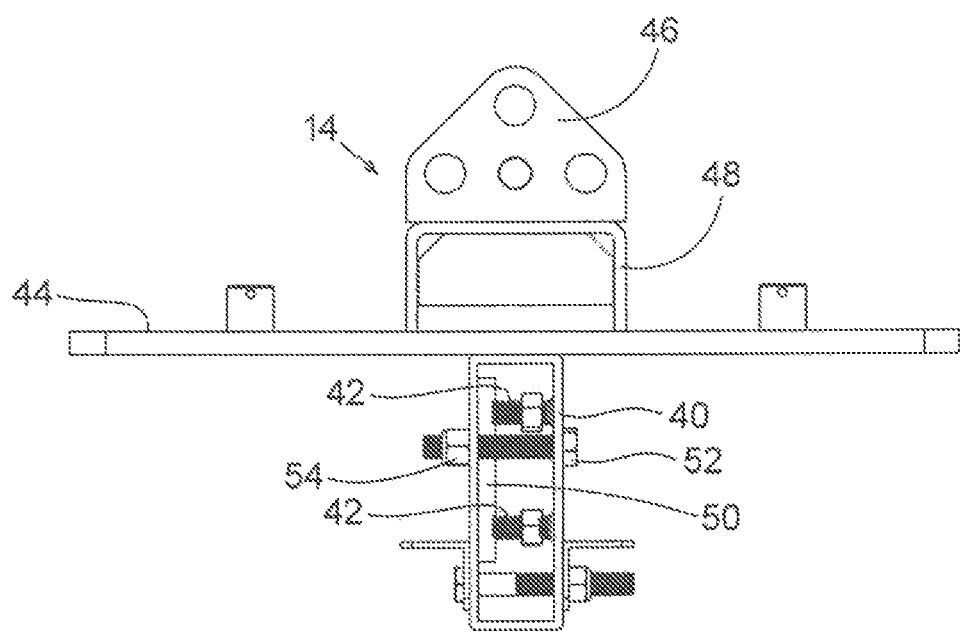

FIG. 11 shows an end view of the upright connector of FIG. 3.

Figure 12:
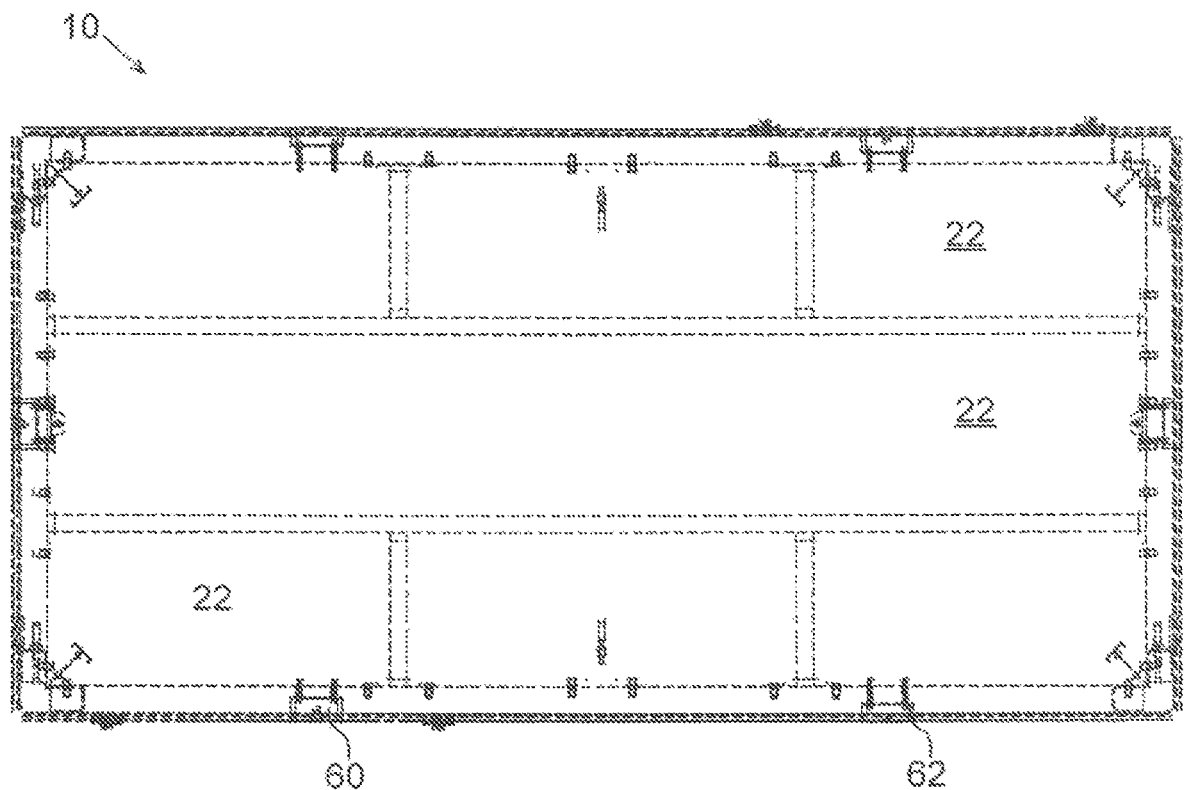

FIG. 12 is a bottom view of the platform system shown in FIG. 4.

Figure 13:
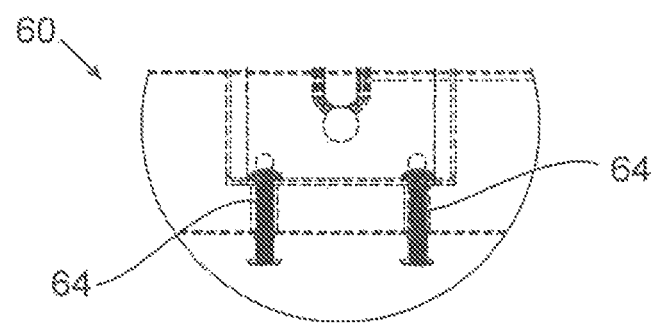

FIG. 13 shows a male roto look used with the platform system shown in FIG. 12.

Figure 14:
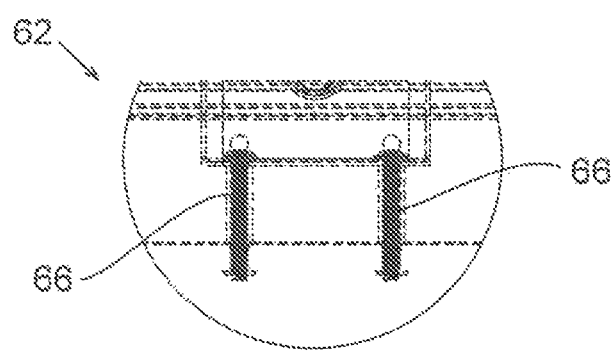

FIG. 14 shows a female roto lock used with the platform system shown in FIG. 13.

Figure 15:
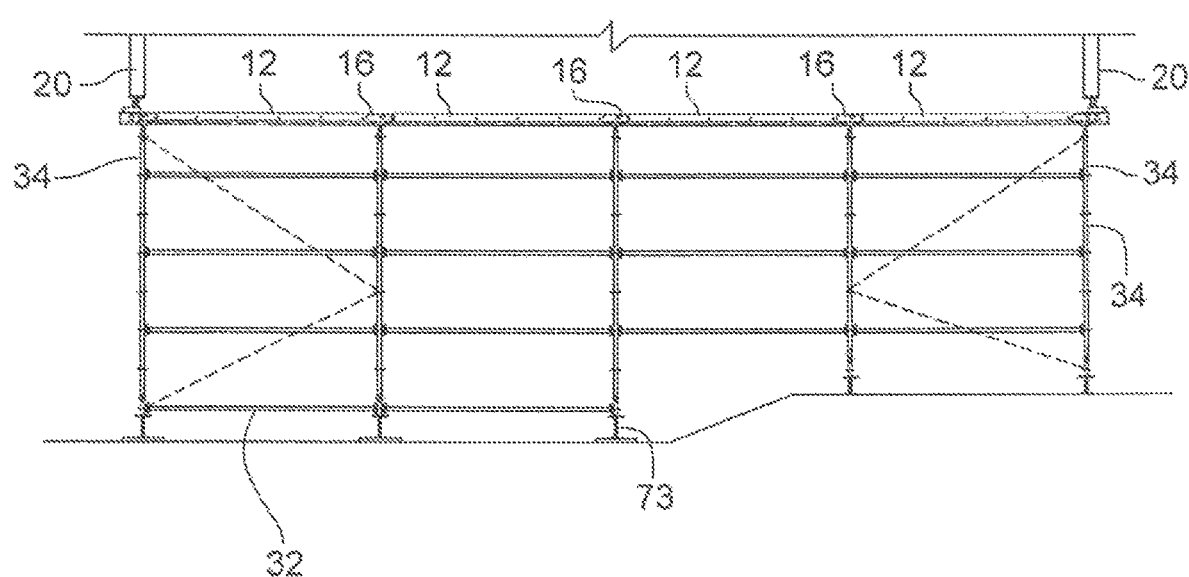

FIG. 15 shows the elevation of the system of this invention in greater detail.

Figure 16:
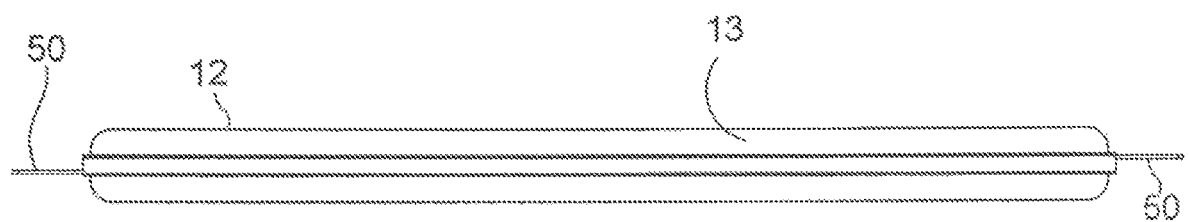

FIG. 16 is a top view of the universal beam of this invention.

Figure 17:
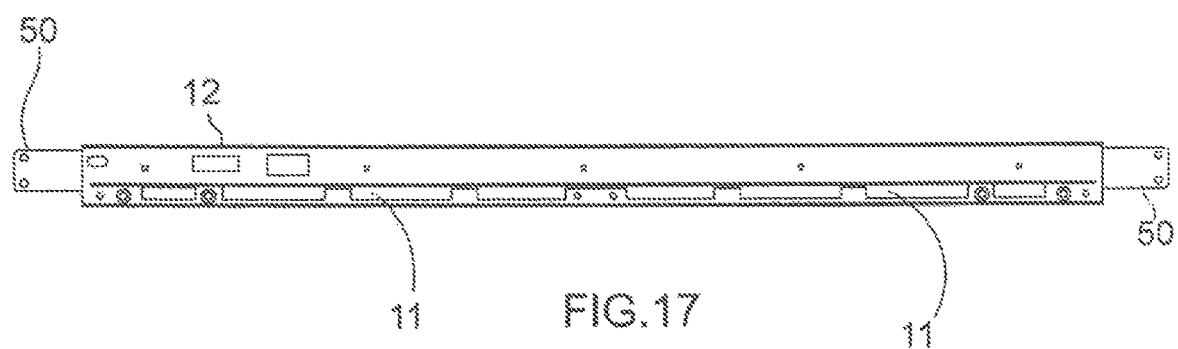

FIG. 17 is a side view of the universal beam of this invention.

Figure 18:
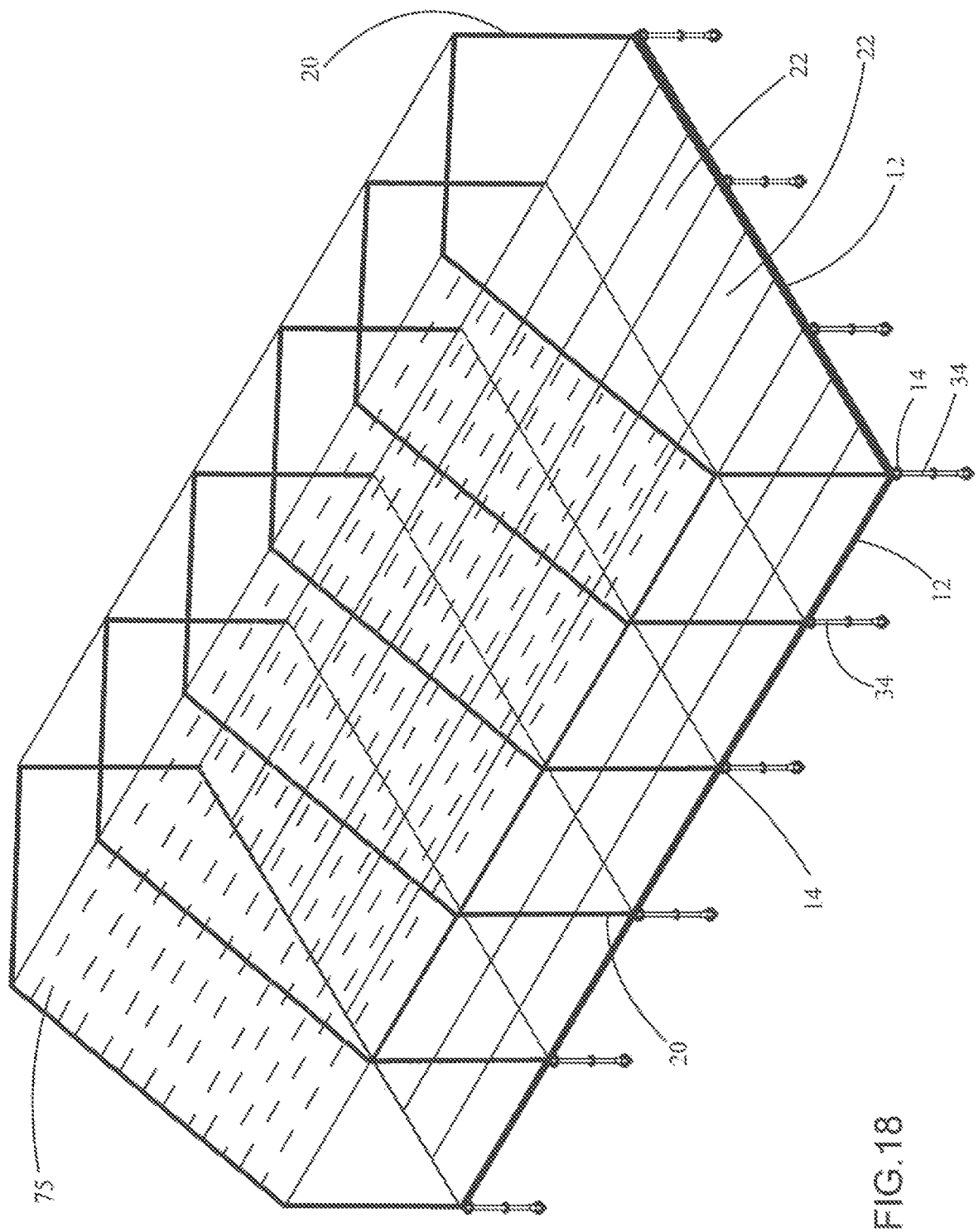

FIG. 18 shows a tent and tent frame supported by the apparatus of this invention.

Figure 19:
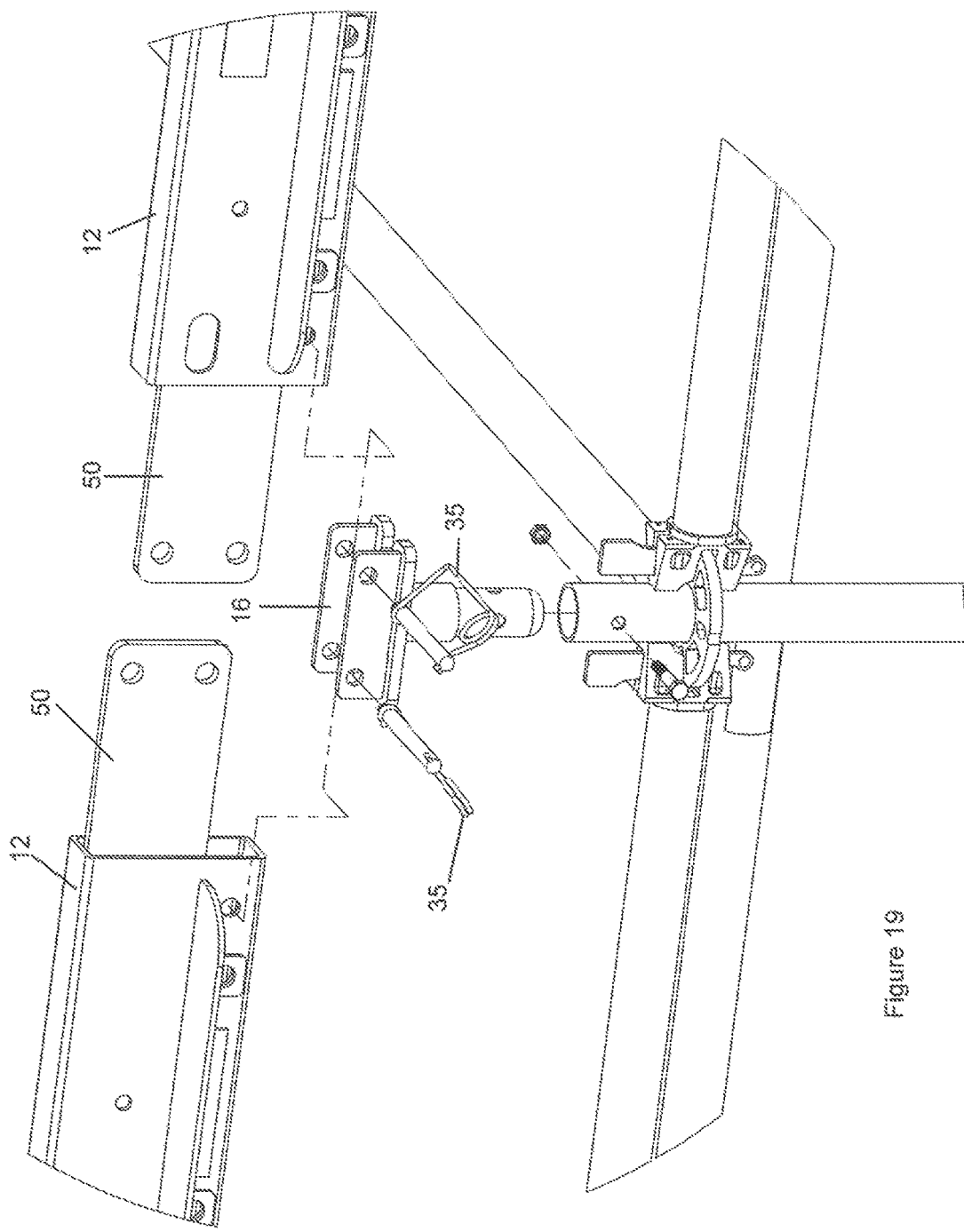

FIG. 19 is an exploded view showing how beam 12 connects to saddle 16.

Figure 20:
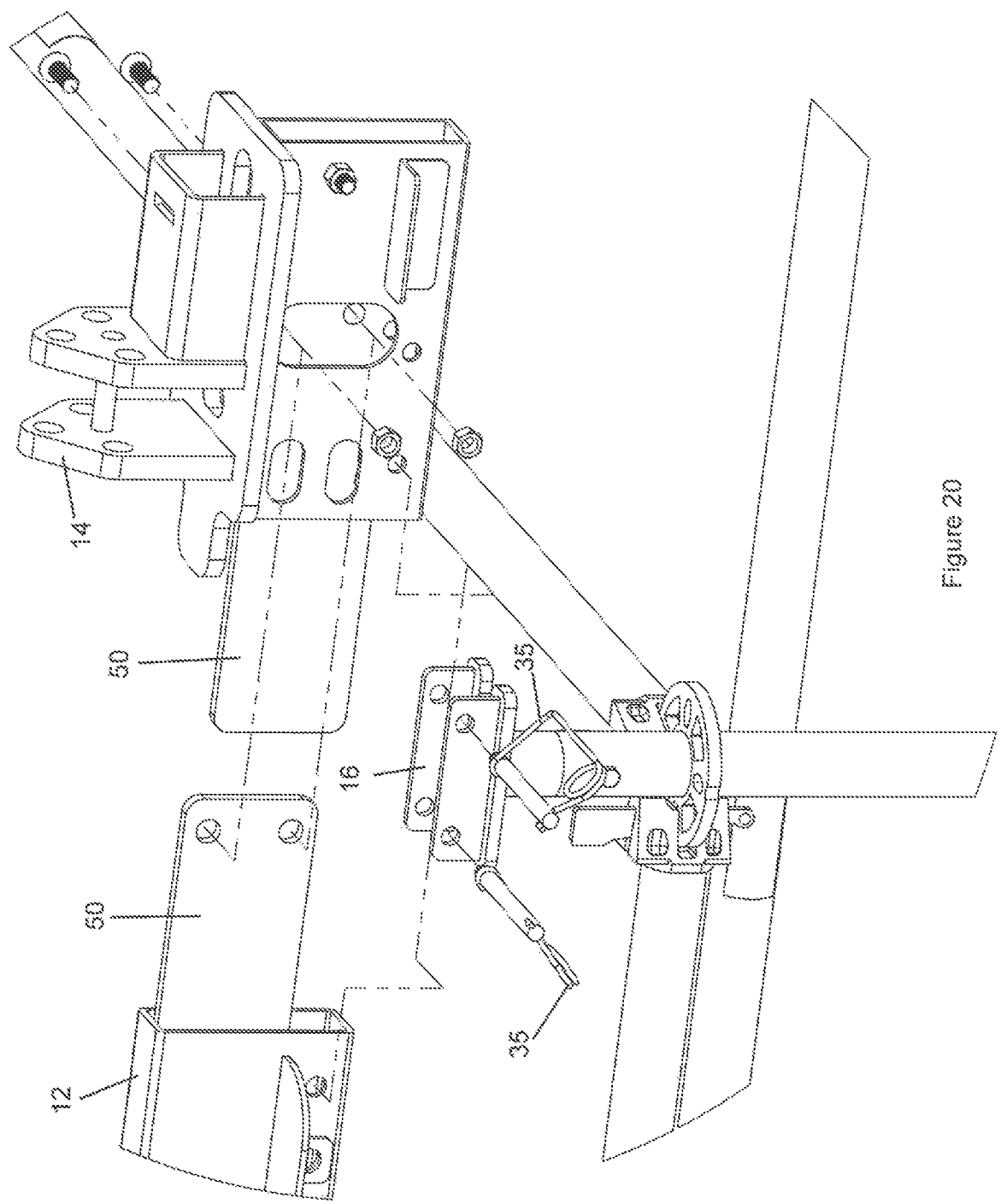

FIG. 20 is an exploded view showing upright connector 14 engaging beams 12.

DETAILED DESCRIPTION OF THE INVENTION

The TF-2100 is the engineered flooring system for the clear span tents and the structures. The TF-2100 flooring system consists of system scaffolding (under structures), and a flooring system. The understructure can be any system scaffolding as long as they have the right load capacity. Flooring systems consists mainly of the following items: saddle, universal beam, TF-2100 platform, and the upright connectors. The base plates will be replaced by the upright connectors.

The upright connectors are specifically designed for this type of tents so the customer has to use the right upright connector for the right tent. The TF-2100 flooring system accommodates most of the clear span tents and structures. When you use different manufacture tent the customer have to use the specific upright connector for the specified tent. The universal beam, saddle and the TF-2100 plate forms are same for any type of tents.

The TF-2100 flooring system is designed to transfer entire load coming from the platform and the tent will be transferred to the scaffold legs. The universal beam, saddle and the TF-2100 platform will transfer platform live load to the legs and the upright connector will transfer the tent load.

The other advantages of this system are the TF-2100 flooring system is designed to go low as 8" elevation to any platform heights. Also, the tent platform will be the exact size of the tent so the platform will not stick outside the tent. This makes the tent floor water proof because when it rains, the water will flow from the wall to the ground not to the platform.

FIG. 1 shows the scaffold system of this invention without a platform. FIG. 1 also shows scaffold system 10 including universal beam 12, upright connector 14, and saddle 16. Upright connector 14 is supported by universal beam 12. Saddle 16 supports universal beam 12.

FIG. 1 also shows conventional scaffold components. For example, FIG. 1 snows connecting devices 30, horizontal posts 32 and scaffold legs 34.

FIG. 2 shows the universal beam 12 in place on a saddle 16 according to this invention. Lips 11 support flooring sections 22.

FIG. 3 shows the upright connector 14 of this invention. Upright connector 14 engages universal beam 12. Lips 11 support flooring sections 22.

As shown in FIGS. 1-3, the TF-2100 flooring system 10 is designed to transfer entire load coming from the platform and the tent to be transferred to the scaffold legs. Universal beam 12, saddle 16, and the TF-2100 platform will transfer platform live load to the legs. Upright connector 14 will transfer the tent load to the scaffold legs.

FIG. 4 shows clear span tent legs and platforms (flooring) in place on the scaffold system of FIG. 1. FIG. 4 shows clear span tent legs 20, TF-2100 platforms 22. FIG. 4 now more clearly shows a plurality of modules 22 arranged side by side.

FIG. 5 shows saddle 16 of this invention. Saddle 16 includes insert 37, platform 33, and pin-snap lock shores 35. Hex jam nut 36 and screw cap 38 are also shown. Also shown is saddle 16 including platform 33 and sides 75.

FIG. 6 shows a side view of saddle 16 of FIG. 5.

FIG. 7 shows an end view of saddle 16 of FIG. 5.

FIG. 8 shows a side view of universal beam 12 of this invention. Beam 12 also includes flanges 50. Flanges 50 are secured to upright connector 14 as shown in FIGS. 10 and 11 with bolt 52 and nut 54. FIG. 8 also shows lips 11 of beam 12 and side 13 of beam 12.

FIG. 9 shows an end view of flanges 50 of universal beam 12 of this invention. Bottom portion 40 of upright connector 14 also is shown circumscribing flanges 50 and beam 12. Lips 11 of beam 12 also are shown.

FIG. 10 shows a side view of upright connector 14 of FIG. 3. Upright connector 14 engages universal beam 12.

Connector 14 comprises bottom portion 40 which circumscribes beam 12. Bolts with hex heads and lock nuts hold insert 49 in place. Screw cap flat head sockets 42 also hold insert 49 in place. Connector 14 also comprises flat plate 44 and upright portion 46.

Upright portion 46 engages clear span tent legs 20 as shown in FIG. 4. In one embodiment, tent legs 20 circumscribe upright portion 46 and rests on flat plate 44. The design of upright connector may vary depending on the design of legs 20.

The upright connectors are specifically designed for this type of tents so the customer has to use the right upright connector for the right tent. The TF-2100 flooring system accommodates most of the clear span tents and structures. When you use different manufacture tent the customer have to use the specific upright connector for the specific tent. The universal beam, saddle, and the TF-2100 plate forms are same for any type of tents.

FIG. 11 shows an end view of upright connector 14 of FIG. 3. Housing 48 supports upright portion 46.

FIG. 12 is a bottom view of the platform system shown in FIG. 4. Male roto locks 60 and female roto locks 62 also are shown.

FIG. 13 shows male roto lock 60 used with the scaffold system shown in FIG. 12

FIG. 14 shows female roto lock 62 used with the scaffold system shown in FIG. 13

FIG. 15 shows the scaffold system of this invention in greater detail. The platforms of FIG. 12 are connected with another platform same size by roto lock. The roto lock is not used to connect the platform to the beam. The lock underneath the platform will secure the platform to the beam. Also shown is jack 73.

Every universal beam is connected with two universal saddles. FIG. 15 shows 4 universal beams. Other embodiments may include even more universal beam connected together to form a chain. At the end you have two upright connectors connected to the distal end and proximal end of the string.

FIGS. 16 and 17 are views of the universal beam in greater detail. A flange 50 is welded to each side of the beam such that the flange is in the same orientation even if the beam is turned 180° horizontally. This makes the beam very special because you eliminate left and right beams. One beam fit all sides.

FIG. 18 shows a tent and tent frame supported by the apparatus of this invention. Shown are beam 12, connector 14, tent legs 20, and scaffold legs 34. Portions of tent 75 are shown in phantom.

FIG. 19 is an exploded view showing scaffold legs 34 supporting saddles 16, saddles 16 support beams 12. Beams 12 include flanges 50. Pin-snap lock shores 35 connect flanges 50 to saddle 16. FIG. 19 is an exploded view of FIG. 2.

FIG. 20 is an exploded view showing scaffold legs 34 supporting saddles 16, saddles 16 support beams 12, beams 12 supporting upright connectors 14 and upright connectors 14 support tent legs 20, shown in FIG. 4. Beams 12 include flanges 50. Pin-snap lock shores 35 connect flanges 50 to saddle 16. Upright connector 14 engages beam 12. Bolts with hex heads and lock nuts hold connector 14 in place on beam 12. FIG. 20 is an exploded view of FIG. 3.

The other advantages of this system are the TF-2100 flooring system is designed to go low as 8" elevation to any platform heights. Also, the tent platform will be the exact size of the tent so the platform will not stick outside of the tent. This makes the tent floor water proof because when it rains, the water will flow from the wall to the ground not to the platform.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. An apparatus comprising a modular platform system with scaffold understructure for supporting a tent and a tent frame wherein the apparatus comprises more than one assembly of:
   a scaffold leg having a ground end and a supporting end;
   a saddle connected to the supporting end of a scaffold leg, wherein the saddle engages and supports a first beam and a second beam;
   wherein the first beam and the second beam have a flange attached to each end of the first beam and each end of the second beam;
   wherein the flanges of the first beam and the second beam are oriented such that the flanges of the first beam can be inserted into the second beam, without creating a left beam and right beam;
   wherein the first beam and the second beam are joined together at the saddle by inserting a flange of the first beam into the second beam and inserting a flange of the second beam into the first beam, resulting in the flange of the first beam and the flange of the second beam being adjacent;
   wherein the first beam and the second beam have a shaped cross-section with opposing lips configured to engage and support a platform flooring section; and
   an upright connector, having a flange, connected to at least one beam;
   wherein the apparatus transfers the load from the tent to the ground through the upright connector, the beams, the saddle, and the scaffold leg.

2. An apparatus according to claim 1 wherein the upright connector further comprises:
   a bottom portion supported by the first beam;
   a flat plate supported by the bottom portion; and
   an upright portion supported by the flat plate, wherein the upright portion is configured to engage a tent leg.

3. An apparatus according to claim 1 wherein the saddle further comprises pin-snap lock shores for fastening the beams to the saddle.

4. An apparatus according to claim 2 wherein the upright portion is a geometric projection.

5. An apparatus according to claim 1 wherein a multiplicity of the beams and the saddles can be arranged to accommodate a plurality of configurations.

6. An apparatus comprising a modular platform system with scaffold understructure for supporting a tent and a tent frame wherein the apparatus comprises more than one assembly of:
   a scaffold leg having a ground end and a supporting end;
   a saddle connected to the supporting end of a scaffold leg, wherein the saddle engages and supports a first beam and a second beam;
   wherein the first beam and the second beam have a flange attached to each end of the first beam and each end of the second beam;
   wherein the flanges of the first beam and the second beam are oriented such that the flanges of the first beam can be inserted into the second beam, without creating a left beam and right beam;
   wherein the first beam and the second beam are joined together at the saddle by inserting the flange of the first beam into the second beam and inserting the flange of the second beam into the first beam, resulting in the flange of the first beam and the flange of the second beam being adjacent;
   wherein one of the flanges of the second beam is inserted into the first beam adjacent to the flange of the first beam; and
   an upright connector, having a flange, capable of engaging a beam;
   wherein the apparatus transfers the load from the tent to the ground through the upright connector, the beams, the saddle, and the scaffold leg.

7. An apparatus according to claim 6 wherein the first and the second beam have a shaped cross-section with opposing lips;
   wherein the lips are configured to engage and support a platform flooring section.

* * * * *